United States Patent
Nagatomi et al.

(10) Patent No.: US 7,609,606 B2
(45) Date of Patent: Oct. 27, 2009

(54) OPTICAL PICKUP DEVICE

(75) Inventors: Kenji Nagatomi, Gifu (JP); Seiji Kajiyama, Gifu (JP); Yoichi Tsuchiya, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 776 days.

(21) Appl. No.: 11/302,343

(22) Filed: Dec. 14, 2005

(65) Prior Publication Data

US 2006/0140078 A1 Jun. 29, 2006

(30) Foreign Application Priority Data

Dec. 28, 2004 (JP) .............................. 2004-381252

(51) Int. Cl.
*G11B 7/00* (2006.01)
(52) U.S. Cl. .............................. 369/112.01; 369/44.37; 369/112.03; 369/112.05
(58) Field of Classification Search ........................ None
See application file for complete search history.

(56) References Cited

U.S. PATENT DOCUMENTS

| | | | |
|---|---|---|---|
| 5,493,554 A | 2/1996 | Sasaki et al. | |
| 6,580,674 B1 * | 6/2003 | Nishiyama et al. | 369/112.01 |
| 2004/0120244 A1 * | 6/2004 | Higashino | 369/112.24 |
| 2004/0125737 A1 * | 7/2004 | Iwata et al. | 369/121 |

FOREIGN PATENT DOCUMENTS

JP 06-131688 5/1994

OTHER PUBLICATIONS

Chinese Office Action, with English Translation, issued in Chinese Patent Application No. CN 200510134062.2, filed on May 18, 2007.

* cited by examiner

*Primary Examiner*—Joseph H Feild
*Assistant Examiner*—Christopher R Lamb
(74) *Attorney, Agent, or Firm*—McDermott Will & Emery LLP

(57) ABSTRACT

Provided is an optical pickup device capable of suppressing an increase in the number of parts and complication of an optical system while a diffraction grating is used as an optical axis correcting element. Three kinds of blue, red, and infrared laser light beams are emitted from laser element provided in the same CAN package. A blue light emitting point (wavelength: 405 nm) and an infrared light emitting point (wavelength: 780 nm) are arranged in a layer forming direction of the laser elements such that an interval (d2) between the light emitting points becomes shorter than an interval (d1) between each of the light emitting points and a red light emitting point. An optical axis of the laser light beam emitted from the red light emitting point (wavelength: 650 nm) is aligned with an optical axis of the laser light beam emitted from the blue or infrared light emitting point by using the diffraction grating. The number of diffraction gratings for optical axis correction can be made to one and a single photo detector can be commonly used for laser light beams having different wavelengths.

14 Claims, 10 Drawing Sheets

101: THREE-WAVELENGTH LASER
102: POLARIZATION BEAM SPLITTER
103: COLLIMATOR LENS
104: BEAM EXPANDER
105: 1/4-λ PLATE
106: OBJECTIVE LENS
107: CYLINDER LENS
108: OPTICAL AXIS CORRECTING ELEMENT
109: PHOTO DETECTOR

*WHEN LASER LIGHT EMISSION*

*WHEN LASER LIGHT RECEPTION*

FOUR-STEP GRATING PATTERN

DIFFRACTION ORDER AND DIFFRACTION EFFICIENCY

|  | 405nm | 650nm | 780nm |
|---|---|---|---|
| DIFFRACTION ORDER | 0 | +1 | 0 |
| DIFFRACTION EFFICIENCY | 96 | 80 | 98 |

DESIGN VALUES OF OPTICAL AXIS CORRECTING ELEMENT (1) STEP HEIGHT H = 1.57 μm
(2) REFRACTION INDEX
    WAVELENGTH 405 nm: n = 1.53
    WAVELENGTH 650 nm: n = 1.52
    WAVELENGTH 780 nm: n = 1.51

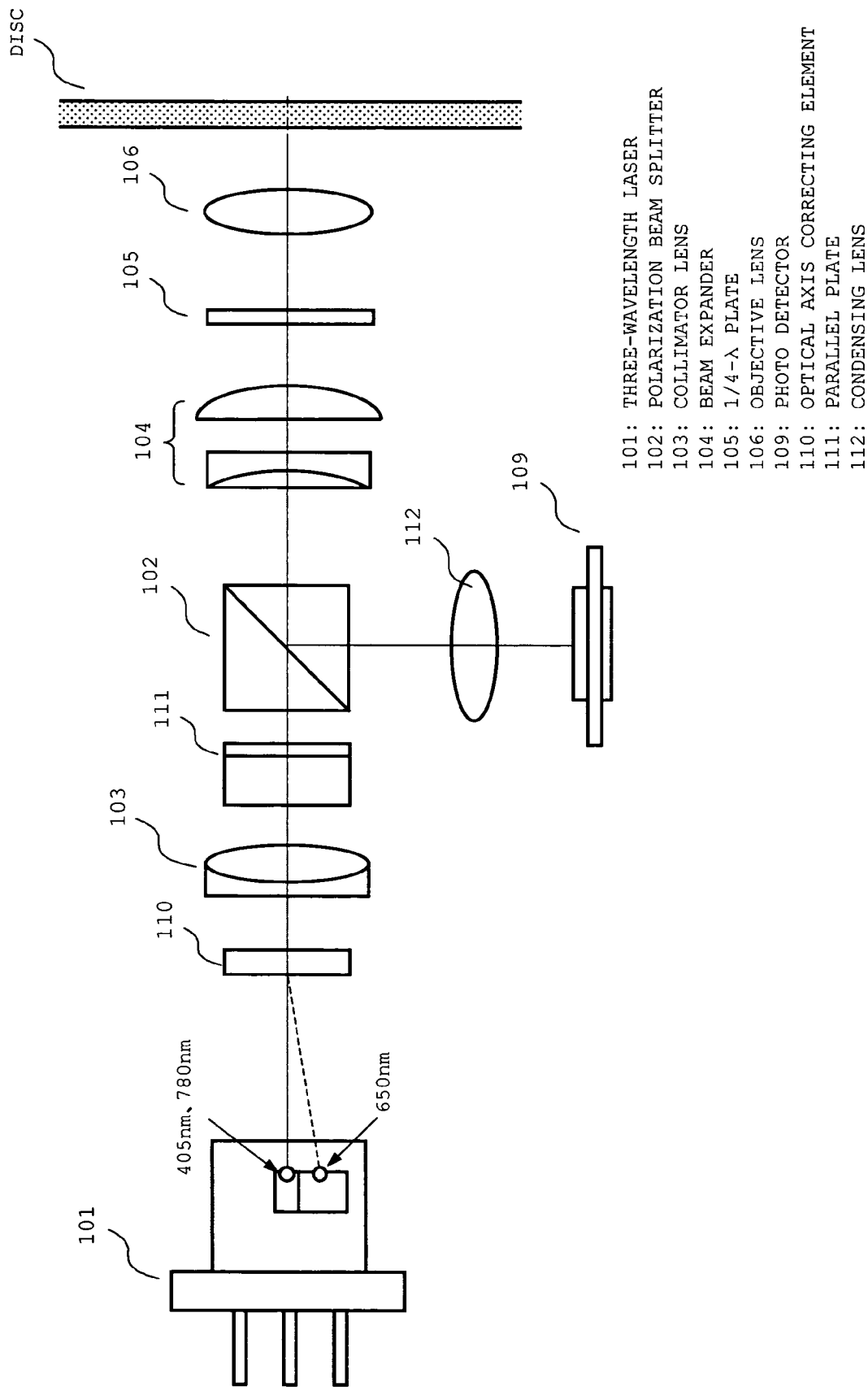

OPTICAL PICKUP DEVICE

BACKGROUND OF THE INVENTION

1. Field of the Invention

The present invention relates to an optical pickup device, and more particularly to an optical pickup device suitable for a compatible optical pickup device for emitting several kinds of laser beams having different wavelengths to a recording medium.

2. Description of the Related Art

Currently, various optical discs such as a compact disc (CD) and a digital versatile disc (DVD) have been commercialized and widely used. Further, next-generation DVD standardization for recording and reproducing information using a blue-violet laser beam has been recently proceeded. In the next-generation DVD, information is recorded and reproduced using the blue-violet laser beam having a wavelength of about 405 nm. When the wavelength of the laser beam shortens, a higher density can be obtained.

Therefore, when the variety of optical discs increases, development of a so-called compatible optical pickup device capable of performing recording and reproduction on different kinds of optical discs is desired. In order to irradiate an optical disc with laser beams having different wavelengths, it is possible to employ an arrangement in which semiconductor lasers that emit laser beams having different wavelengths are separately disposed in the optical pickup device. However, when such arrangement is employed, spaces for separately disposing the semiconductor lasers and optical elements for guiding the laser beams to an objective lens are required corresponding to each semiconductor laser. Consequently, the external dimensions of the optical pickup device become large and the number of parts increases. Thus, an arrangement in which a plurality of laser elements having different emitting wavelengths are provided all together in a single CAN package has been studied. According to such arrangement, a space for disposing the semiconductor lasers can be reduced and an optical system can be commonly used among the laser beams.

However, when the plurality of laser elements are provided in the single CAN package as described above, a deviation occurs in a direction between the optical axes of the laser beams according to arrangement gap between the respective laser elements. Therefore, when the optical axis of the optical system is aligned with the optical axis of a laser beam, the optical axes of other laser beams deviate from the optical axis of the optical system. In recording and reproduction using the other laser beams, there arises a problem in that aberration of laser beams on a recording medium occurs to cause deterioration of optical characteristics.

Therefore, according to a prior art described in JP06-131688 A, a birefringence element is disposed immediately after a semiconductor laser including several kinds of laser elements, and the optical axes of the laser beams are aligned with one another by the birefringence element to guide the laser beams to the optical system.

However, the prior art requires an additional birefringence element. In addition, it is necessary to form in advance the laser elements such that the polarization plane of the reference laser beam is orthogonal to the polarization plane of each of the other laser beams. However, it is hard to form laser elements in which polarization planes of laser beams are made different from one another. Also, since the birefringence element is expensive, a problem occurs in that a cost of the optical pickup device as a whole increases.

Such a problem can be solved by using a diffraction grating as an optical axis correcting element. When the diffraction grating is used as the optical axis correcting element, an increase in cost can be suppressed. In addition, it is unnecessary to form a corresponding laser element in an adjusted position in view of the polarization planes of the respective laser light beams having wavelengths unlike JP 06-131688 A.

However, when the diffraction grating is used as the optical axis correcting element, a problem in which the power of each of the laser light beams attenuates occurs because of a relationship between each wavelength and diffraction efficiency.

The diffraction action made by the diffraction grating depends on n-times (n: natural number) a wavelength, so the same diffraction action is applied to laser light beams having different wavelengths in which a wavelength is equal to or nearly equal to n-times another wavelength. For example, in a compatible optical pickup device for CD, DVD, and next-generation DVD, a wavelength of a laser light beam for CD (infrared color: about 780 nm in wavelength) is nearly equal to two times a wavelength of a laser light beam for next-generation DVD (blue color: about 405 nm in wavelength). Therefore, it is difficult to effectively apply the diffraction action to only any one of the laser light beam for CD and the laser light beam for next-generation DVD. Thus, it is difficult to effectively align an optical axis of the laser light beam for CD with an optical axis of the laser light beam for next-generation DVD by using the diffraction grating.

In contrast to this, while the optical axis of the laser light beam for CD is not aligned with the optical axis of the laser light beam for next-generation DVD, when the optical axis of any one of the laser light beams is aligned with an optical axis of an optical system, a problem in which the optical properties of the other of the laser light beams deteriorate occurs. This deterioration becomes significantly as the amount of optical axis deviation between the laser light beams increases. In particular, when the optical axis deviation is caused on a photo detector, a reproduction signal and various error signals cannot be smoothly led. In such a case, the photo detector is required for each of the laser light beams. If so, it is necessary to dispose, for example, an additional optical part for beam separation. This causes an increase in the number of parts and the complication of a structure.

SUMMARY OF THE INVENTION

An object of the present invention is to provide an optical pickup device capable of suppressing an increase in the number of parts and complication of an optical system while a diffraction grating is used as an optical axis correcting element.

According to one aspect of the present invention, an optical pickup device includes:

a semiconductor laser including three laser elements provided in a CAN package, for generating three kinds of laser light beams including a laser light beam for next-generation DVD, a laser light beam for DVD, and a laser light beam for CD, in which a first light emitting point of the laser light beam for next-generation DVD and a second light emitting point of the laser light beam for CD are arranged in a layer forming direction of the laser elements so that an interval d2 between the first light emitting point and the second light emitting point becomes smaller than an interval d1 between one of the first light emitting point and the second light emitting point and a third light emitting point of the laser light beam for DVD; and a diffraction grating for aligning an optical axis of the laser light beam for DVD with one of an optical axis of the laser light beam for next-generation DVD and an optical axis of the laser light beam for CD.

According to the optical pickup device in this aspect, the deterioration of optical properties of the respective laser light beams can be effectively suppressed while the diffraction grating is used as the optical axis correcting element. That is, when the optical axis correction action is applied to the laser light beam for DVD (red light beam) by the diffraction grating, it is possible to improve the optical properties of the laser light beam for DVD. A wavelength of the laser light beam for DVD (red light beam) is about 650 nm and thus is not equal to or nearly equal to n-times (n: natural number) a wavelength of the laser light beam for next-generation DVD (blue light beam) and n-times a wavelength of the laser light beam for CD (infrared light beam). Therefore, the optical axis correction action using the diffraction grating can be smoothly applied to only the laser light beam for DVD. When the light emitting point of the laser light beam for next-generation DVD (blue light beam) and the light emitting point of the laser light beam for CD (infrared light beam) are arranged in the layer forming direction of the laser elements, the interval d2 between these light emitting points can be extremely shortened. Thus, even when, of these laser light beams, a laser beam whose optical axis is deviated from the optical axis of the optical system is not subjected to the optical axis correction, the degree of deterioration of the optical properties of the laser light can be suppressed to be low.

In this aspect, the diffraction grating can be located on an optical path leading from one of the first, second, and third light emitting points to an objective lens. Therefore, the optical properties of the laser light beam for DVD (red laser light beam) on a recording medium can be improved. Alternatively, in this aspect, the diffraction grating can be located on an optical path which leads from the objective lens to a photo detector and is not overlapped with the optical path leading from the one of the first, second, and third light emitting points to the objective lens. Therefore, it is possible to suppress the attenuation of power of a laser light beam emitted to the recording medium.

According to this aspect, the optical pickup device can further include a parallel plate tilted relative to the optical axis of the laser light beam for next-generation DVD (blue laser light beam) and the optical axis of the laser light beam for CD (infrared laser light beam), for aligning the optical axis of the laser light beam for next-generation DVD and the optical axis of the laser light beam for CD with each other by refractive action. According to the present invention, the optical axis of the laser light beam for next-generation DVD (blue light beam) and the optical axis of the laser light beam for CD (infrared light beam) are aligned with each other by the parallel plate, so that the laser light beams can be allowed to enter the optical system without any deviation. Therefore, the optical properties of the laser light beams can be improved.

In such a case, the amount of optical axis deviation of each of the laser light beams can be suppressed to be extremely small as described above, so it is possible to adequately correct the optical axis deviation even when a low-cost and thin parallel plate is used. Thus, according to the present invention, the optical properties of the laser light beam for next-generation DVD (blue light beam) and the optical properties of the laser light beam for CD (infrared light beam) can be improved while an increase in cost and the complication of a structure are suppressed.

Note that the parallel plate is located on one of a first optical path and a second optical path, the first optical path leading from one of the first, second, and third light emitting points to the objective lens, the second optical path being an optical path which leads from the objective lens to the photo detector and is not overlapped with the first optical path leading from the one of the first, second, and third light emitting points to the objective lens. When the parallel plate is located on the first optical path leading from the one of the first, second, and third light emitting points to the objective lens, it is possible to improve the optical properties of the infrared laser light beam and the optical properties of the blue laser light beam on the recording medium. When the parallel plate is located on the second optical path which leads from the objective lens to the photo detector and is not overlapped with the first optical path leading from the one of the first, second, and third light emitting points to the objective lens, it is possible to suppress the attenuation of power of a laser light beam emitted to the recording medium.

It is desirable to locate the parallel plate on an optical path in which a laser light beam becomes parallel light. Therefore, it is possible to prevent aberration such as astigmatism from introducing into a laser light beam passing through the parallel plate.

BRIEF DESCRIPTION OF THE DRAWINGS

The above-mentioned and other objects of the present invention and the novel features thereof will be completely more clear when the following descriptions of the embodiments are read with reference to the accompanying drawings:

FIG. 10 shows an optical system of an optical pickup device according to Embodiment 4 of the present invention.

DETAILED DESCRIPTION OF PREFERRED EMBODIMENTS

Hereinafter, embodiments of the present invention will be described with reference to the accompanying drawings.

Embodiment 1

Figure 1:
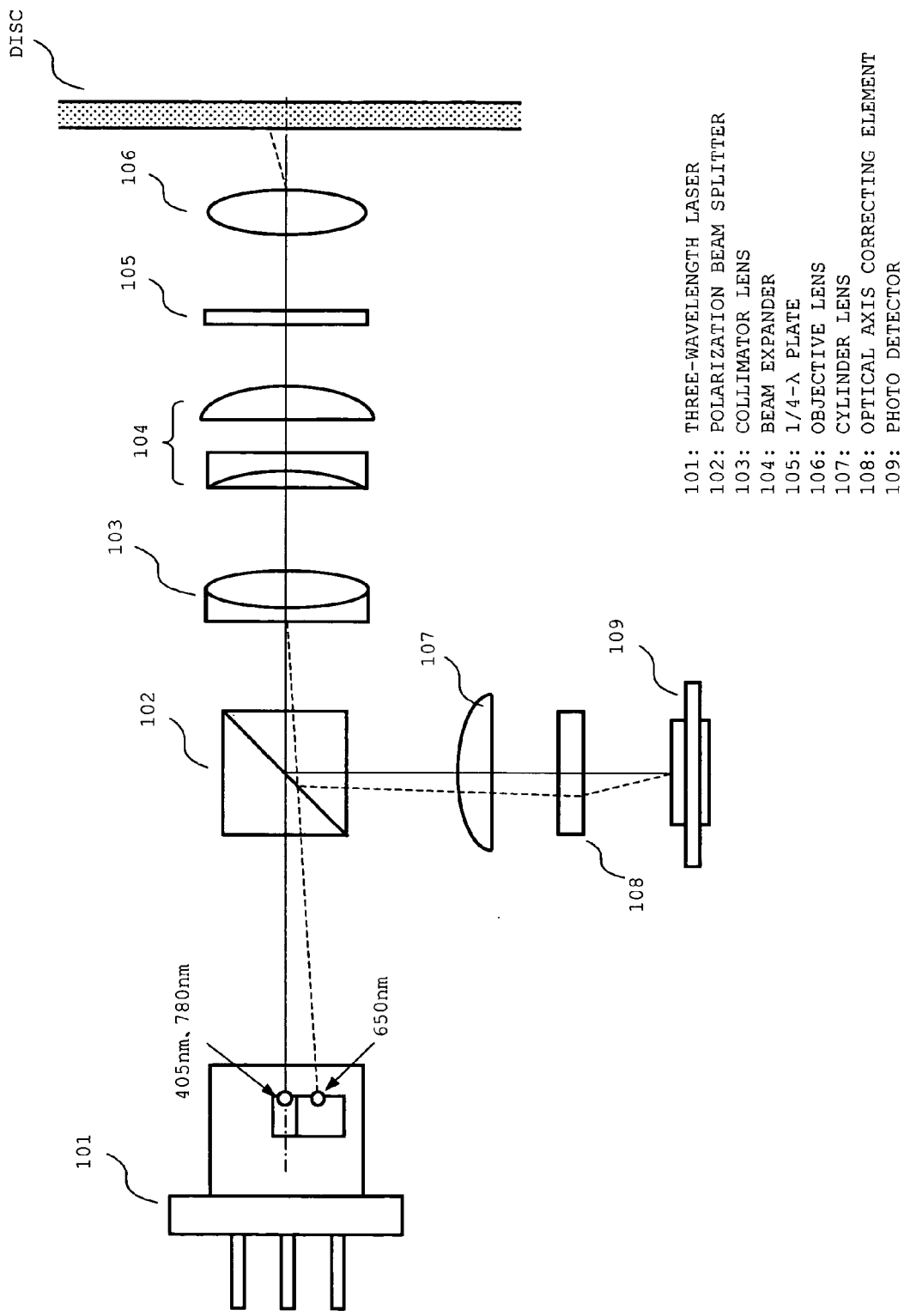
FIG. 1 shows an optical system of an optical pickup device according to Embodiment 1 of the present invention.

FIG. 1 shows a structure of an optical pickup device. The optical pickup device is used as a compatible pickup device for CD/DVD/next-generation DVD.

The optical pickup device as shown in the drawing includes a three-wavelength laser 101, a polarization BS (beam splitter) 102, a collimator lens 103, a beam expander 104, a λ/4 plate 105, an objective lens 106, a cylinder lens 107, an optical axis correcting element 108, and a photo detector 109.

The three-wavelength laser 101 includes three laser elements for emitting a laser light beam for CD (infrared color: 780 nm in wavelength), a laser light beam for DVD (red color: 650 nm in wavelength), and a laser light beam for next-generation DVD (blue color: 405 nm in wavelength), which are housed in the same CAN package. Polarization planes of the laser light beams emitted from the respective laser elements become parallel to one another. Note that an optical system including from the polarization BS 102 to the objective lens 106, the cylinder lens 107, the optical axis correcting element 108, and the photo detector 109 are aligned with an optical axis of the laser light beam for next-generation DVD, of the laser light beams emitted from the three-wavelength laser 101.

The polarization BS 102 completely transmits the laser light beam emitted from the three-wavelength laser 101 and completely reflects the laser light beam from a disc 100.

The collimator lens 103 converts each of the incident laser light beams having the respective wavelengths from the polarization BS 102 into a parallel light beam. Here, the collimator lens 103 is formed by bonding a plurality of lenses whose Abbe numbers and curvatures (spherical surfaces) are adjusted such that an achromatic effect can be realized for each of the laser light beams having the respective wavelengths.

The beam expander 104 includes a concave lens, a convex lens, and an actuator for adjusting a distance between the two lenses in an optical axis direction. The distance between the concave lens and the convex lens is adjusted in response to a servo signal from a servo circuit (not shown) to correct a wavefront state of a laser light beam. In this embodiment, as described later, the objective lens 106 is designed so as to become a finite system for only the laser light beam for CD. Therefore, it is necessary to adequately correct a wavefront state of the laser light beam for CD to the objective lens 106. When the laser light beam for CD is used, the beam expander 104 provides wavefront correction action to the laser light beam for CD such that the wavefront state of the laser light beam becomes an adequate state.

The λ/4 plate 105 converts the laser light beam which is converted into parallel light by the collimator lens 103 (linearly polarized light beam) into a circularly polarized light beam. In addition, the λ/4 plate 105 converts the laser light beam reflected on the disc (circularly polarized light beam) into a linearly polarized light beam having a polarization direction orthogonal to that of the laser light beam traveling to the disc. Therefore, the laser light beam reflected on the disc is substantially totally reflected by the polarization BS 102.

The objective lens 106 converges each of the laser light beams having the respective wavelengths on a recording layer. The objective lens 106 is designed so as to become a finite system for the laser light beam for CD and become an infinite system for each of the laser light beam for DVD and the laser light beam for next-generation DVD. In addition, the objective lens 106 is designed so as to converge the laser light beam for CD up to a predetermined numerical aperture and prevent the laser light beam for CD from converging to a point at a numerical aperture which exceeds the predetermined numerical aperture. A board thickness of a CD (1.2 mm) is larger than a board thickness of each of the other discs (0.6 mm), so it is necessary to reduce a numerical aperture of the objective lens 106 for the laser light beam for CD as compared with a numerical aperture thereof for each of the other laser light beams. Therefore, as described above, the objective lens 106 is designed so as to converge only the laser light beam for CD up to the predetermined numerical aperture.

The objective lens 106 is driven in a focusing direction, a tracking direction, and a tilt direction by an objective lens actuator (not shown in FIG. 1). That is, the objective lens 106 is driven in the focusing direction, the tracking direction, and the tilt direction in response to servo signals (tracking servo signal, focusing servo signal, and tilt servo signal) from a servo circuit.

The cylinder lens 107 provides astigmatic action to each of the laser light beams having the respective wavelengths. The cylinder lens 107 is formed by bonding a plurality of lenses whose Abbe numbers and curvatures (spherical surfaces) are adjusted such that an achromatic effect can be realized for each of the laser light beams having the respective wavelengths.

The optical axis correcting element 108 is composed of a diffraction grating and aligns the optical axis of the laser light beam for DVD with the optical axis of the laser light beam for next-generation DVD on the photo detector 109. A structure of the optical axis correcting element 108 and an operation thereof will be described in detail later.

The photo detector 109 has sensor patterns for deriving a reproduction RF signal, a focusing error signal, a tracking error signal, and a tilt error signal from an intensity distribution of a received laser light beam. A signal from each of the sensor patterns is outputted to a reproduction circuit and the servo circuit which are provided on the disc drive side.

In this embodiment, an astigmatic method is employed as a method of generating the focusing error signal and a differential phase detection (DPD) method is employed as a method of generating the tracking error signal. The sensor patterns of the photo detector 109 and the generation of the error signals will be described in detail later.

Figure 2A:
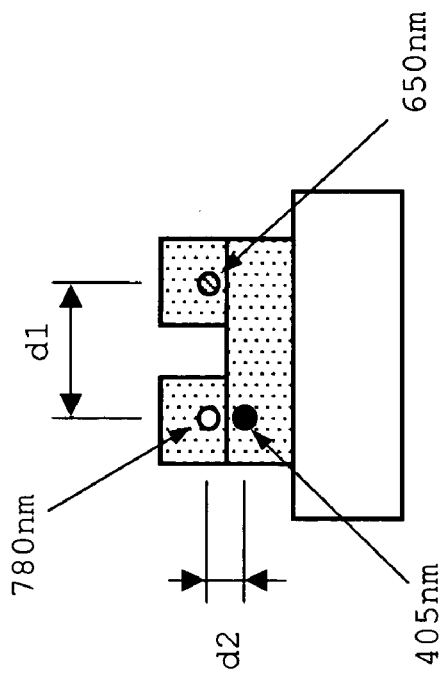
FIGS. 2A and 2B show arrangement patterns of laser elements in Embodiment 1 of the present invention.
Figure 2B:
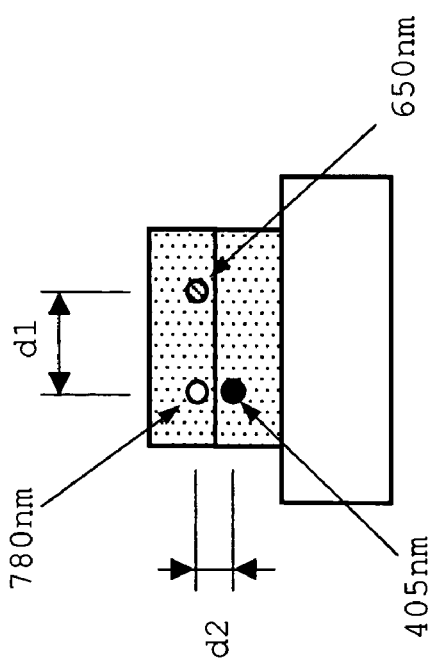

FIGS. 2A and 2B show arrangement patterns of the laser elements of the three-wavelength laser 101. FIG. 2A shows a structural example in which the respective laser elements are mounted in a hybrid fashion. FIG. 2B shows a structural example in which the respective laser elements are monolithically mounted. Note that FIGS. 2A and 2B show the structural examples when the three-wavelength laser 101 is viewed from a beam window side.

As shown in FIG. 2A, a light emitting layer for emitting the laser light beam for CD and the laser light beam for DVD is formed on a light emitting layer for emitting the laser light beam for next-generation DVD such that a light emitting point of the laser light beam for CD (780 nm in wavelength) is located immediately above a light emitting point of the laser light beam for next-generation DVD (405 nm in wavelength). As shown in FIG. 2B, a light emitting layer for emitting the laser light beam for CD is formed on a light emitting layer for emitting the laser light beam for next-generation DVD such that the light emitting point of the laser light beam for CD (780 nm in wavelength) is located immediately above the light emitting point of the laser light beam for next-generation DVD (405 nm in wavelength). A light emitting layer for emitting the laser light beam for DVD is formed in the side of a light emitting layer for emitting the laser light beam for CD.

According to the structural examples, an interval d2 between the light emitting point of the laser light beam for CD and the light emitting point of the laser light beam for next-generation DVD can be significantly shortened as compared with an interval d1 between a light emitting point of the laser light beam for DVD and the light emitting point of the laser light beam for next-generation DVD. Therefore, it is possible to reduce the amount of optical axis deviation between the laser light beam for CD and the laser light beam for next-generation DVD, of the laser light beams emitted from the three-wavelength laser 101.

More specifically, a solder layer, an electrode layer, an insulating layer, and the like are formed between the respective light emitting layers. The interval d2 between the light emitting point of the laser light beam for CD and the light emitting point of the laser light beam for next-generation DVD is provided by the thicknesses of the layers. In view of a layer forming process and a heating problem, a minimum value of the interval d2 is about 1 μm.

Figure 3A:
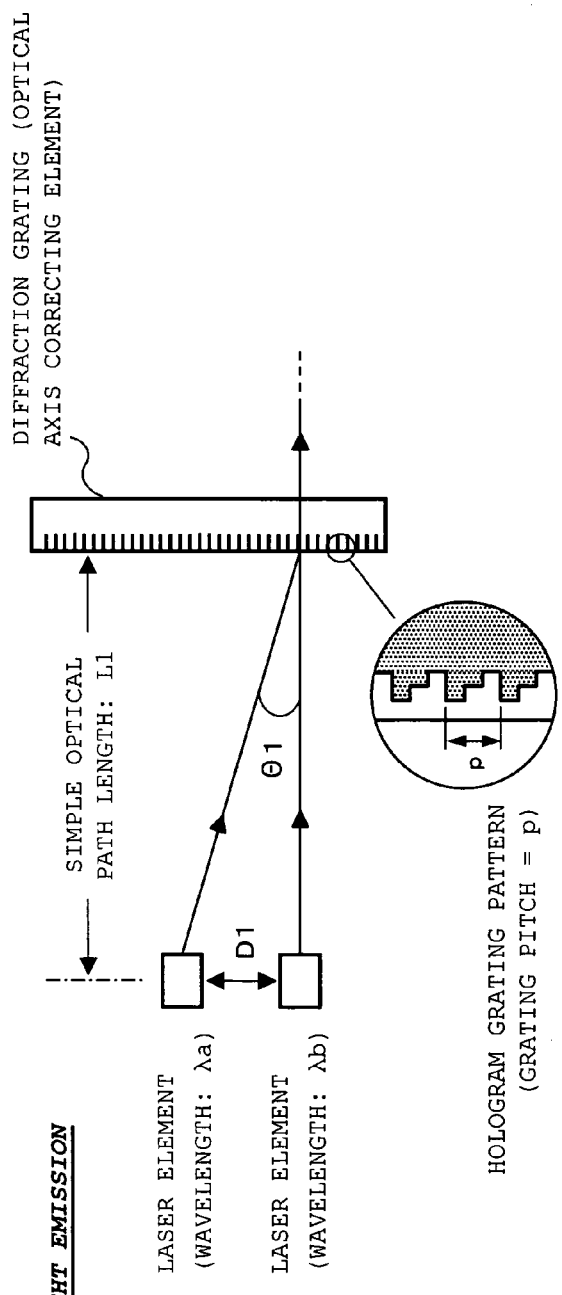
FIGS. 3A and 3B are explanatory views showing an optical axis correction action made by a diffraction grating in Embodiment 1 of the present invention.
Figure 3B:
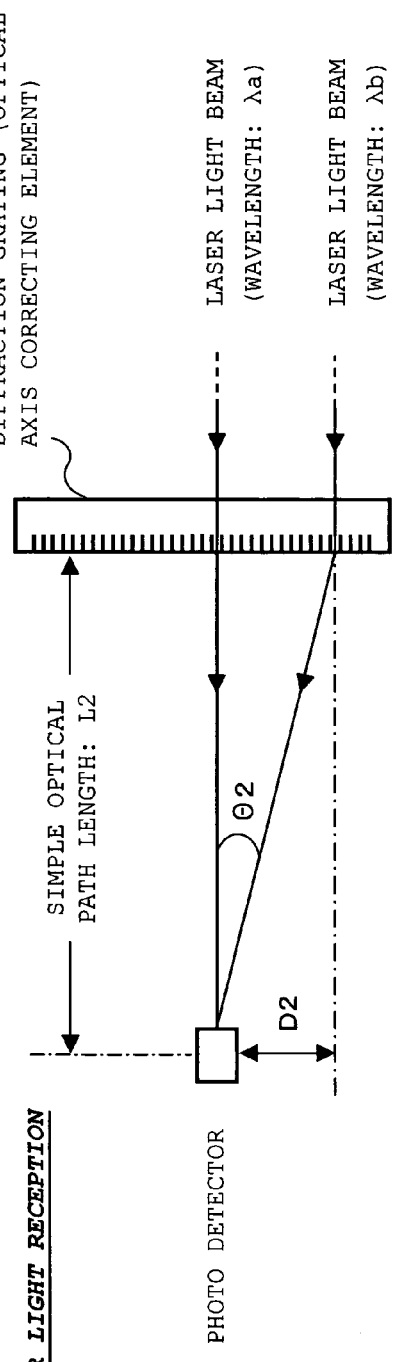

Next, the optical axis correction action in the diffraction grating (optical axis correcting element) will be described with reference to FIGS. 3A and 3B. FIG. 3A shows the case where the diffraction grating is disposed immediately in front of the laser elements. FIG. 3B shows the case where the diffraction grating is disposed immediately in front of the photo detector.

First, referring to FIG. 3A, a hologram grating pattern is formed on the surface on the laser light beam incident side of the optical axis correcting element. FIG. 3A shows a grating pattern in which the number of steps is three. When a grating pitch is given by p, a relationship between a diffraction angle θ of first order light of a laser light beam and a wavelength λ thereof is expressed by the following expressions:

$$\lambda = p \sin \theta \quad (1)$$

$$\theta = \sin^{-1} \lambda/p \quad (2)$$

Therefore, when an optical axis of the laser light beam having the wavelength λa is to be aligned with an optical axis having the wavelength λb by the diffracting action of the optical axis correcting element, light emitting point gap D1 between the laser elements is expressed by the following expression:

$$D1 = L1 \tan \theta 1 \quad (3)$$

Thus, the light emitting point gap D1 is set as follows based on the wavelength λa and the grating pitch p of the optical axis correcting element 103:

$$D1 = L1 \tan(\sin^{-1} \lambda a/p) \quad (4)$$

Therefore, a simple optical path length L1 is obtained from the wavelength λa of the emitted laser light beam and the light emitting point gap D1. The optical axis correcting element is disposed in a position corresponding to the simple optical path length. Thus, the optical axis of the laser light beam having the wavelength λa (first-order diffraction light) can be aligned with the optical axis of the laser light beam having the wavelength λb. When the light emitting point gap D1 and the simple optical path length L1 are determined, the grating pitch p of the diffraction grating may be set based on the expression (4).

As shown in FIG. 3B, when the optical axes of two laser light beams are to be aligned with each other on the photo detector, the expression (4) is modified to the following expression.

$$D2 = L2 \tan(\sin^{-1} \lambda b/p) \quad (5)$$

Therefore, the grating pitch p of the diffraction grating may be calculated from an optical axis interval D2 and a simple optical path length L2 using this expression and the diffraction grating having the grating pitch p may be disposed at a distance corresponding to the simple optical path length L2 from the photo detector.

In the optical system shown in FIG. 1, the optical axis of the laser light beam for DVD (650 nm in wavelength) is aligned with the optical axis of the laser light beam for next-generation DVD (405 nm in wavelength) on the photo detector 109. In this case, the diffraction grating (optical axis correcting element 108) is designed based on the expression (5) and disposed at a distance corresponding to the simple optical path length L2 from the photo detector 109.

Figures 4A, 4B, 4C:
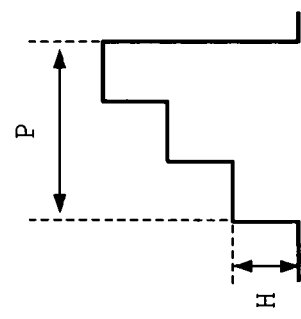
FIGS. 4A, 4B, and 4C show a design example of the diffraction grating, diffraction efficiency thereof, and design values thereof in Embodiment 1 of the present invention.

FIGS. 4A to 4C show a design example of a grating pattern and a result obtained by simulation of diffraction efficiency.

When a grating pattern in which the number of steps is four is formed as shown in FIG. 4A and a design condition of the grating pattern is provided as shown in FIG. 3C, diffraction efficiencies at respective wavelengths can be set to values as shown in FIG. 4B. That is, the diffraction efficiency of first-order diffraction light of the laser light beam for DVD (650 nm in wavelength), which is subjected to optical axis correction can be set to 80%. The diffraction efficiency of zero-order diffraction light of the laser light beam for next-generation DVD (405 nm in wavelength) can be set to 96%. The diffraction efficiency of zero-order diffraction light of the laser light beam for CD (780 nm in wavelength) can be set to 98%.

Figure 5:
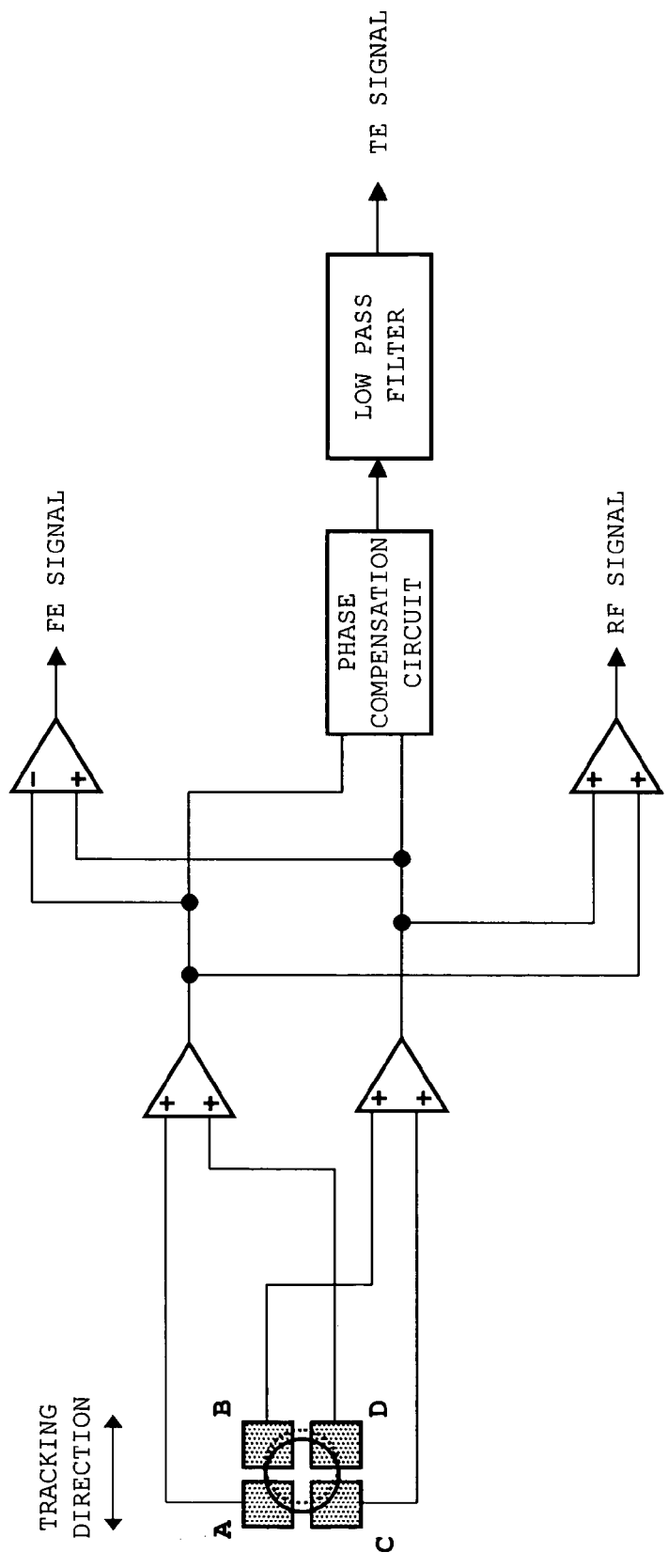
FIG. 5 is a structural diagram showing an example of a sensor pattern and an example of a signal generating circuit in Embodiment 1 of the present invention.

FIG. 5 is a structural diagram showing a sensor pattern of the photo detector 109 and a signal generating circuit thereof.

In this embodiment, the optical axis of the laser light beam for DVD (650 nm in wavelength) is aligned with the optical axis of the laser light beam for next-generation DVD (wavelength: 405 nm) by the optical axis correcting element 109 and then the laser light beam for DVD is incident on the photo detector 109. The laser light beam for CD (wavelength: 780 nm) is incident on the photo detector 109 while the optical axis of the laser light beam for CD is deviated from the optical axis of the laser light beam for next-generation DVD. Here, the photo detector 109 is aligned with the optical axis of the laser light beam for next-generation DVD, so the laser light beam for DVD is converged to a center position of a four-part sensor provided on the photo detector 109 in addition to the laser light beam for next-generation DVD. In contrast to this, the optical axis of the laser light beam for CD is deviated from the optical axis of the laser light beam for next-generation DVD. Therefore, as indicated by a broken line in FIG. 5, the laser light beam for CD is converged to a position shifted from the center position of the four-part sensor according to the amount of optical axis deviation.

However, the amount of optical axis deviation of the laser light beam for CD can be suppressed to an extremely small amount as described above, so the amount of shift becomes very small. Therefore, even when the beam shift occurs on the sensor, the deteriorations of the reproduction signal and the error signals due to the beam shift can be suppressed to the extent that recording and reproducing characteristics are not influenced.

Thus, according to this embodiment, the laser light beam for next-generation DVD, the laser light beam for DVD, and the laser light beam for CD can be received by the single photodetector. At this time, only the single optical axis correcting element is used, it is possible to reduce the number of parts and simplify the optical system in addition to the common use of the photodetector. As described above, according to this embodiment, when the arrangement of the light emitting elements is modified, the optical pickup device can be simplified.

Embodiment 2

Figure 6:
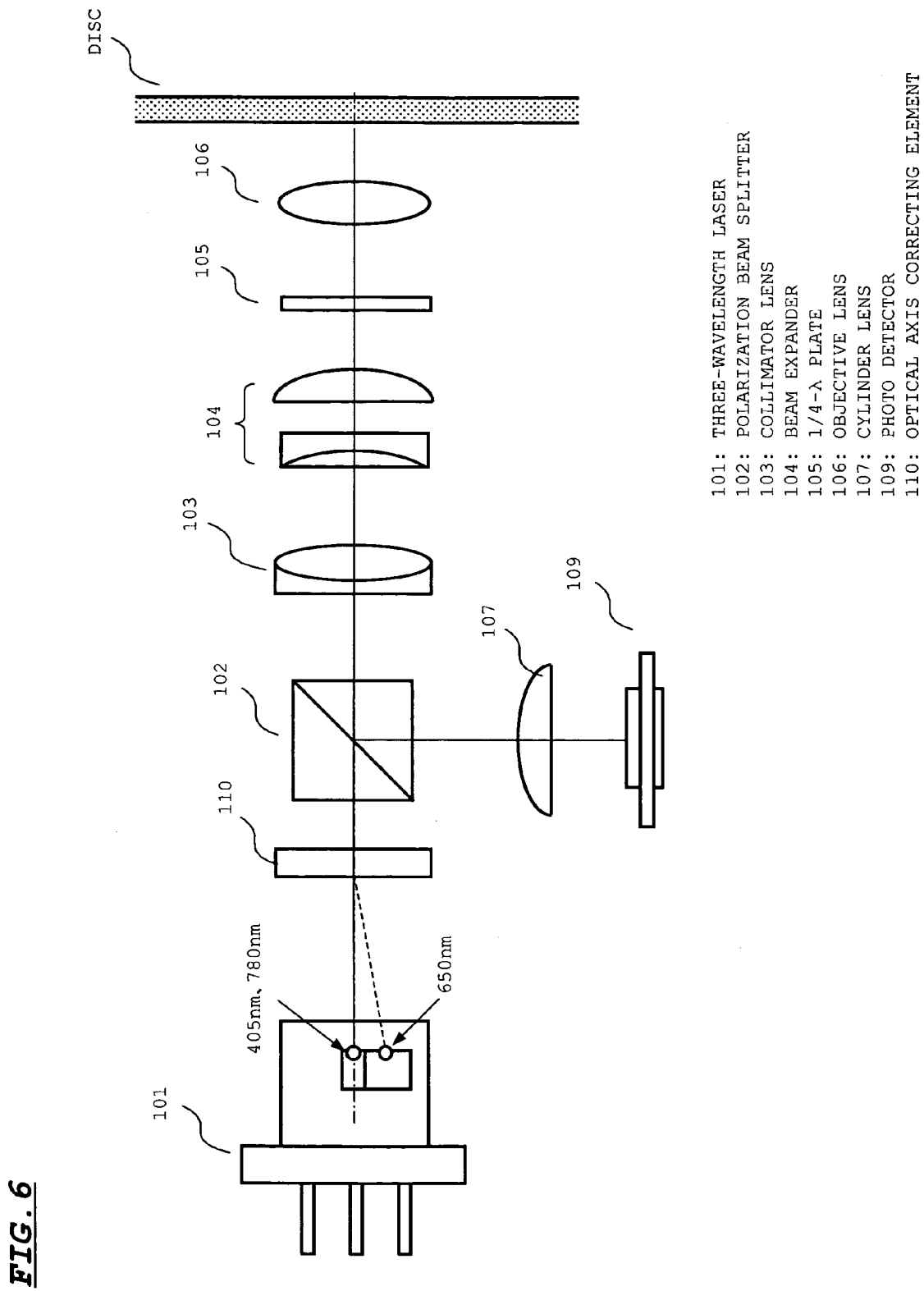
FIG. 6 shows an optical system of an optical pickup device according to Embodiment 2 of the present invention.

FIG. 6 shows an optical pickup device according to this embodiment. In this embodiment, before the laser light beam for DVD is incident on the disc, the optical axis of the laser light beam for DVD is aligned with the optical axis of the laser light beam for next-generation DVD. In this embodiment, the optical axis correcting element 108 is omitted and a novel optical axis correcting element 110 is disposed unlike the optical system in Embodiment 1 as shown in FIG. 1. Other structures are identical to those of the optical system in Embodiment 1.

The optical axis of the laser light beam for DVD (wavelength: 650 nm), which is emitted from the three-wavelength laser 101, is aligned with the optical axis of the laser light beam for next-generation DVD (wavelength: 405 nm) by the optical axis correcting element 110 and then the laser light beam for DVD is incident on the polarization BS 102. Therefore, the laser light beam for DVD is incident on a subsequent optical system without the optical axis deviation.

According to this embodiment, although the laser power is attenuated by the optical axis correcting element 110 unlike Embodiment 1, a positional deviation of the laser light beam for DVD from the objective lens 106 can be suppressed. Therefore, it is possible to suppress the deterioration of the optical properties of the laser light beam for DVD on the disc. Note that the optical axis correcting element 110 is designed and disposed as described with reference to FIG. 3A.

Embodiment 3

Figure 7:
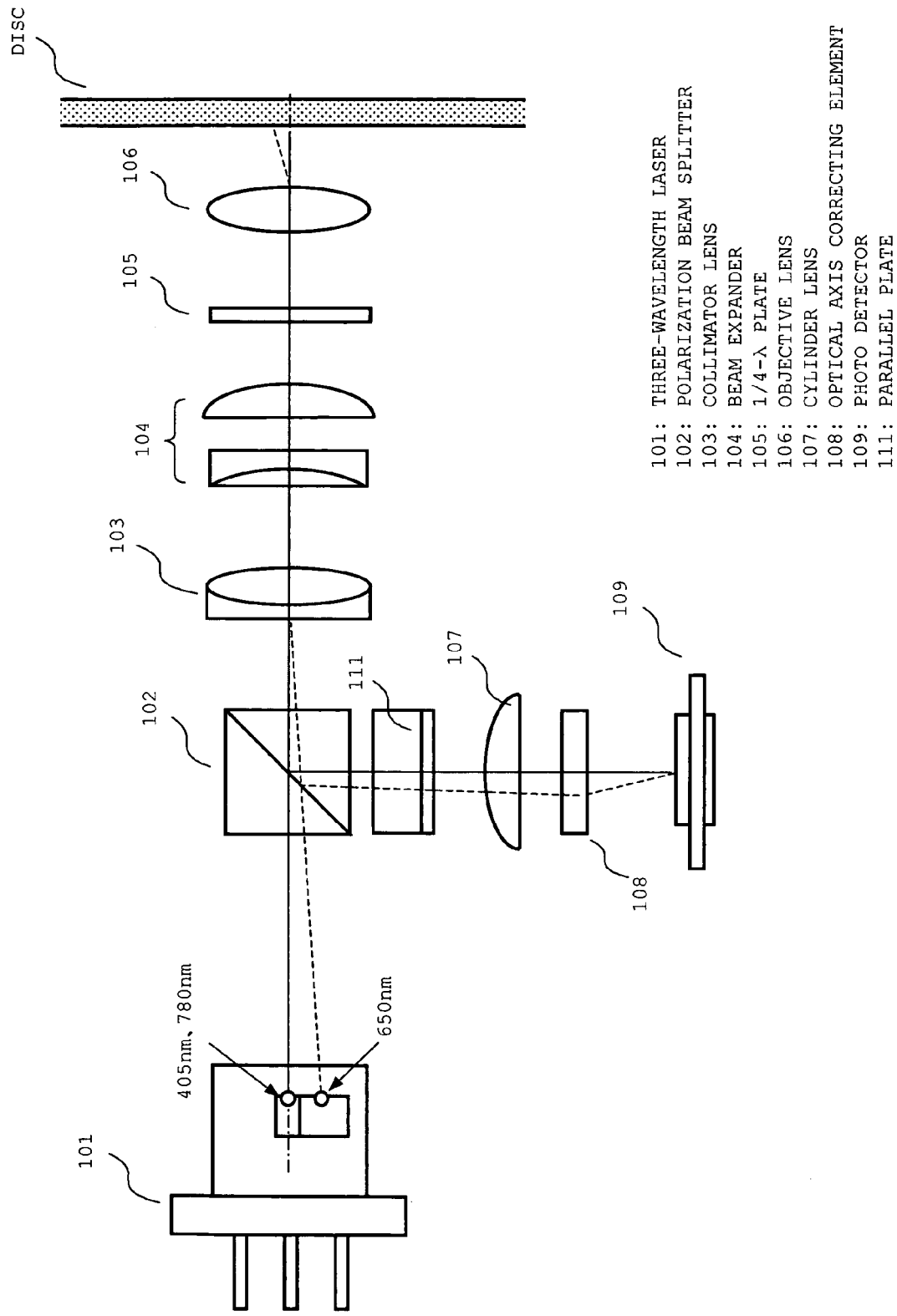
FIG. 7 shows an optical system of an optical pickup device according to Embodiment 3 of the present invention.

FIG. 7 shows an optical pickup device according to this embodiment. In this embodiment, in addition to the alignment of the optical axis of the laser light beam for DVD with the optical axis of the laser light beam for next-generation DVD, the optical axis of the laser light beam for CD is aligned with the optical axis of the laser light beam for next-generation DVD. In this embodiment, a parallel plate 111 is newly disposed unlike the optical system in Embodiment 1 as shown in FIG. 1. Other structures are identical to those of the optical system in Embodiment 1. Note that the wavelength of the laser light beam for CD is 785 nm in this Embodiment.

Figure 8:
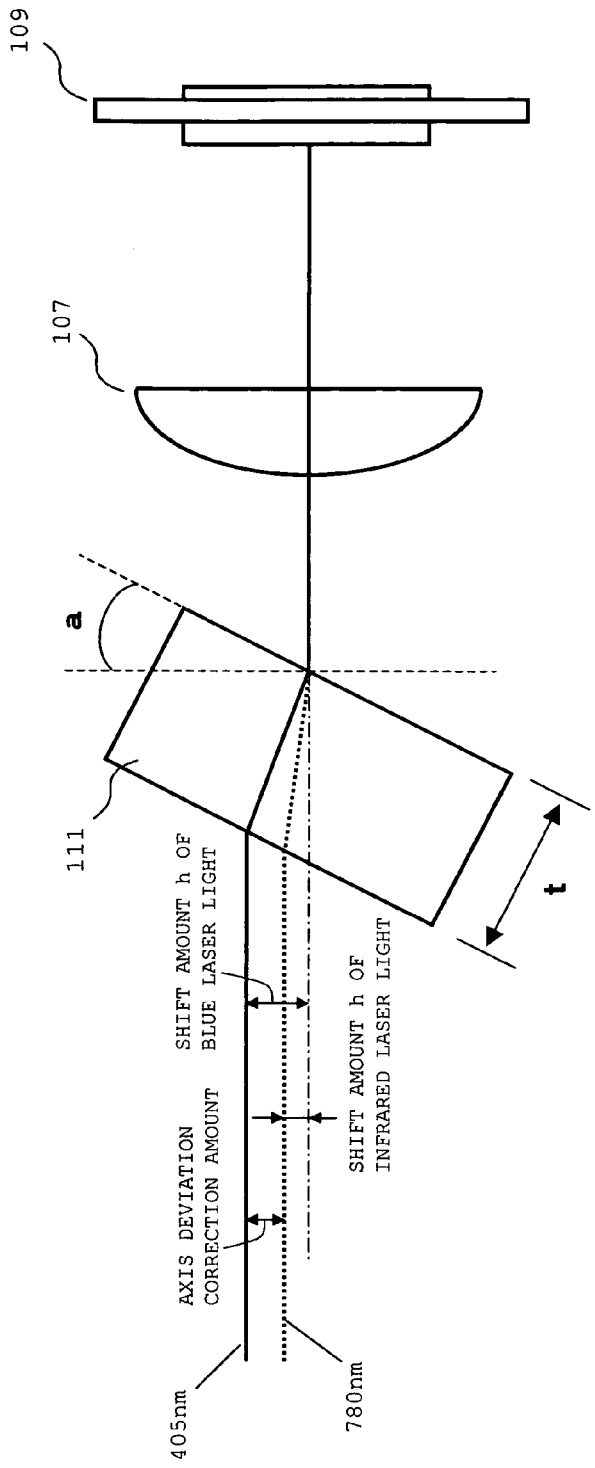
FIG. 8 is an explanatory view showing an optical axis correction action made by a parallel plate in Embodiment 3 of the present invention.

FIG. 8 shows a relationship between the disposition of the parallel plate and optical axis deviation correcting action.

Assume that a thickness of the parallel plate is t, a tilt angle relative to the optical axis is "a", and a refractive index is n. In this case, the amount of shift (h) of the optical axis which is caused by the parallel plate is expressed by $(h=t/\cos(\sin^{-1}(\sin(a)/n))*\sin(a))$. Therefore, as shown in FIG. 8, a glass material SF7 (Abbe number vd=34.6 and reference refractive index nd=1.64) is used as a forming material of the parallel plate, a thickness thereof is set to 1 mm, and a tilt angle "a" relative to the optical axis is set to 45°. In such a case, the amount of shift of the optical axis of the laser light beam for next-generation DVD (wavelength: 405 nm) and the amount of shift of the optical axis of the laser light beam for CD (wavelength: 785 nm) becomes 0.78 mm and 0.785 mm, respectively. Therefore, a difference between the amount of shift of the optical axis of the laser light beam for next-generation DVD (wavelength: 405 nm) and the amount of shift of the optical axis of the laser light beam for CD (wavelength: 780 nm) becomes about 5 μm. This difference is the amount of correction of the optical axis deviation. Thus, when the interval d2 between the light emitting point of the laser light beam for next-generation DVD and the light emitting point of the laser light beam for CD (see FIGS. 2A and 2B) is about 5 μm, it is possible to correct the optical axis deviation of the laser light beam for CD.

According to this embodiment, the laser light beam for CD is incident on the photo detector 109 after the optical axis thereof is aligned with the optical axis of the laser light beam for DVD. Therefore, signal characteristics in the case where the laser light beam for CD is used can be improved as compared with Embodiment 1. At this time, as described above, the interval d2 between the light emitting point of the laser light beam for CD and the light emitting point of the laser light beam for next-generation DVD can be suppressed to an extremely small value, so the optical axis deviation can be corrected using not the diffraction grating but the parallel plate. Thus, according to this embodiment, the signal characteristics in the case where the laser light beam for CD is used can be improved while the complication of the optical system and an increase in cost are suppressed.

The amount of correct of the optical axis deviation becomes larger as the tilt angle "a" to be set, of the parallel plate increases. On the other hand, an occupied region of the parallel plate in the optical axis direction and the amount of shift of the entire beam become larger as the tilt angle "a" increases. Therefore, it is desirable to suppress the tilt angle "a" of the parallel plate to an angle of up to 600.

Figure 9:
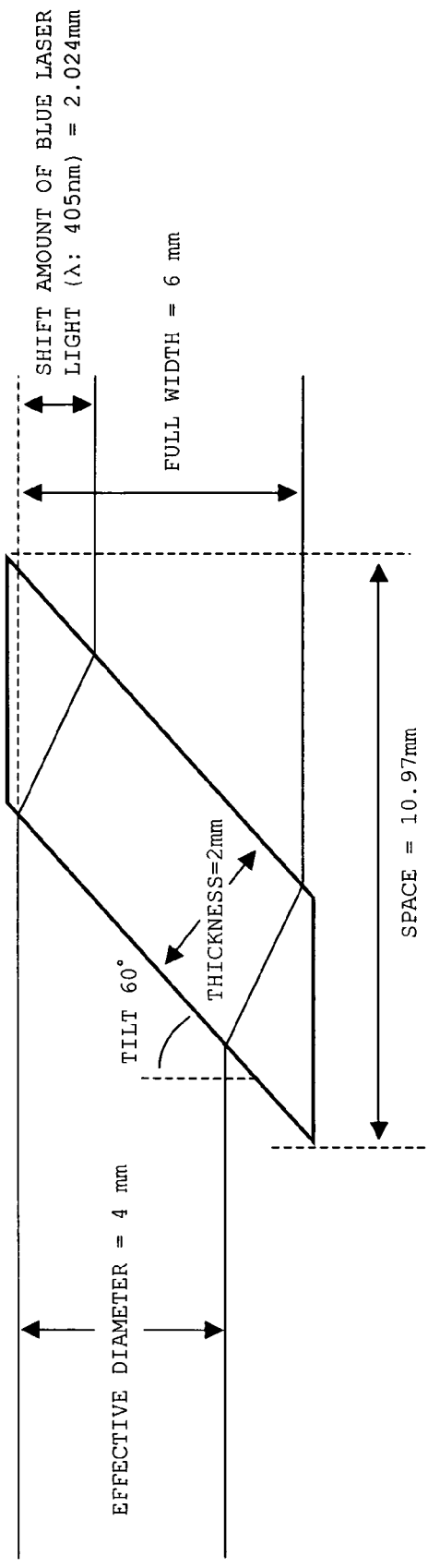
FIG. 9 is an explanatory view showing a size of the parallel plate and a method of disposing the parallel plate in Embodiment 3 of the present invention.

The thickness of the parallel plate is set to about 2 mm or less in practice in view of a relationship between the occupied region thereof and the optical system. Therefore, in this embodiment, an effective diameter of the beam is set to about 4 mm. When the parallel plate having the optical properties as described above is used and the tilt angle "a" of the parallel plate is set to 60° as shown in FIG. 9, a space length in the optical axis direction becomes 10.97 mm. However, because a focal distance of the collimator lens 103 which is normally used is 10 mm to 20 mm, when the parallel plate is tilted any more, it is difficult to dispose another optical part between the collimator lens 103 and the photo detector 109. Thus, in practice, the tilt angle "a" of the parallel plate is set to an angle of up to 60° and the thickness thereof is set to about 2 mm or less.

In this case, the amount of correction of the optical axis deviation becomes about 21.10 μm. Therefore, when the optical axis deviation of the laser light beam for CD is to be corrected using the parallel plate, it is desirable that the interval d2 between the light emitting point of the laser light beam for next-generation DVD and the light emitting point of the laser light beam for CD (see FIGS. 2A and 2B) be set to an interval of up to about 20 μm.

When the parallel plate having the above-mentioned optical properties is used in a set condition in which the tilt angle "a" thereof is 45° and the thickness thereof is about 2 mm, the amount of correction of the optical axis deviation becomes about 10 μm. Therefore, in such a case, it is desirable to set the light emitting point interval d2 (see FIGS. 2A and 2B) to an interval of up to about 10 μm.

Embodiment 4

FIG. 10 shows an optical pickup device structure according to this embodiment. In this embodiment, the parallel plate 111 for correcting the optical axis deviation of the laser light beam for CD is further added to the optical system in Embodiment 2 as shown in FIG. 6. In the optical system described in this embodiment, the collimator lens 103 is disposed between the optical axis correcting element 110 and the parallel plate 111 unlike Embodiment 2. This is because aberration such as a stigmatism introduced when diffusion light or convergent light is incident on the parallel plate 111 is avoided. Although the cylinder lens 107 is used for the introduction of astigmatism in Embodiment 2, a condensing lens 112 having a combination of spherical surface and a cylindrical surface is used instead of the cylinder lens in this embodiment. Such a modification is due to that parallel light is incident on the condensing lens 112. The condensing lens 112 applies astigmatism action to the incident parallel light. Other structures are identical to those in Embodiment 2.

According to this embodiment, the laser light beam for CD is incident on the objective lens 106 after the optical axis thereof is corrected. Therefore, the optical properties of the laser light beam for CD on the disc can be improved as compared with Embodiment 2. The laser light beam for CD whose optical axis is corrected is incident on the photo detector 109, so the signal characteristics in the case where the laser light beam for CD is used can be improved as in Embodiment 3.

Although the embodiments of the present invention are described, the present invention is not limited to the above-mentioned embodiments. The embodiments of the present invention can be variously modified as appropriate without departing from the scope of technical idea described in the claims.

What is claimed is:

1. An optical pickup device, comprising:
   three laser elements provided in a CAN package, for emitting three kinds of laser light beams of blue, red, and infrared light beams to a recording medium, a blue light emitting point and an infrared light emitting point being arranged in a layer forming direction of the laser elements so that an interval (d2) between the blue light emitting point and the infrared light emitting point becomes smaller than an interval (d1) between one of the blue light emitting point and the infrared light emitting point and a red light emitting point; and
   a diffraction grating for aligning an optical axis of a laser light beam emitted from the red light emitting point with an optical axis of a laser light beam emitted from one of the blue light emitting point and the infrared light emitting point.

2. An optical pickup device according to claim 1, wherein the diffraction grating is located on one of a first optical path and a second optical path, the first optical path leading from one of the blue, red, and infrared light emitting points to the objective lens, the second optical path being an optical path which leads from the objective lens to the photo detector and is not overlapped with the first optical path leading from the one of the blue, red, and infrared light emitting points to the objective lens.

3. An optical pickup device according to claim 1, further comprising a parallel plate for aligning the optical axis of the laser light beam emitted from the blue light emitting point with the optical axis of the laser light beam emitted from the infrared light emitting point.

4. An optical pickup device according to claim 3, wherein the interval (d2) between the blue light emitting point and the infrared light emitting point is set in a range between about 20 μm and a minimum limit value of the interval between the blue light emitting point and the infrared light emitting point in a case where the blue light emitting point and the infrared light emitting point are arranged in the layer forming direction of the laser elements.

5. An optical pickup device according to claim 4, wherein when the parallel plate is tilted 45.degree. relative to the optical axes of the blue light beam and the infrared light beam, the interval (d2) between the blue light emitting point and the infrared light emitting point is set in a range between about 10 μm and a minimum limit value of the interval between the blue light emitting point and the infrared light emitting point in the case where the blue light emitting point and the infrared light emitting point are arranged in the layer forming direction of the laser elements.

6. An optical pickup device according to any one of claims 3 to 5, wherein the parallel plate is located on one of a first optical path and a second optical path, the first optical path leading from one of the blue, red, and infrared light emitting points to the objective lens, the second optical path being an optical path which leads from the objective lens to the photo detector and is not overlapped with the first optical path leading from the one of the blue, red, and infrared light emitting points to the objective lens.

7. An optical pickup device according to claim 6, wherein the parallel plate is located on an optical path in which a laser light beam becomes parallel light.

8. An optical pickup device, comprising:
   a semiconductor laser including three laser elements provided in a CAN package, for generating three kinds of laser light beams including a laser light beam for next-generation DVD, a laser light beam for DVD, and a laser light beam for CD, a first light emitting point of the laser light beam for next-generation DVD and a second light emitting point of the laser light beam for CD being arranged in a layer forming direction of the laser elements so that an interval (d2) between the first light emitting point and the second light emitting point becomes smaller than an interval (d1) between one of the first light emitting point and the second light emitting point and a third light emitting point of the laser light beam for DVD; and
   a diffraction grating for aligning an optical axis of the laser light beam for DVD with one of an optical axis of the laser light beam for next-generation DVD and an optical axis of the laser light beam for CD.

9. An optical pickup device according to claim 8, wherein the diffraction grating is located on one of a first optical path and a second optical path, the first optical path leading from one of the first, second, and third light emitting points to the objective lens, the second optical path being an optical path which leads from the objective lens to the photo detector and is not overlapped with the first optical path leading from the one of the first, second, and third light emitting points to the objective lens.

10. An optical pickup device according to claim 8, further comprising a parallel plate tilted relative to the optical axis of the laser light beam for next-generation DVD and the optical axis of the laser light beam for CD, for aligning the optical axis of the laser light beam for next-generation DVD and the optical axis of the laser light beam for CD with each other by refractive action.

11. An optical pickup device according to claim 10, wherein the interval (d2) between the light emitting point for next-generation DVD and the light emitting point for CD is set in a range between about 20 μm and a minimum limit value of the interval between the blue light emitting point and the infrared light emitting point in a case where the light emitting point for next-generation DVD and the light emitting point for CD are arranged in the layer forming direction of the laser elements.

12. An optical pickup device according to claim 11, wherein when the parallel plate is tilted 45.degree. relative to an optical axis, the interval (d2) between the light emitting point for next-generation DVD and the light emitting point for CD is set in a range between about 10 μm and a minimum limit value of the interval between the light emitting point for next-generation DVD and the light emitting point for CD in the case where the light emitting point for next-generation DVD and the light emitting point for CD are arranged in the layer forming direction of the laser elements.

13. An optical pickup device according to any one of claims 10 to 12, wherein the parallel plate is located on one of a first optical path and a second optical path, the first optical path leading from one of the blue, red, and infrared light emitting points to the objective lens, the second optical path being an optical path which leads from the objective lens to the photo detector and is not overlapped with the first optical path leading from the one of the blue, red, and infrared light emitting points to the objective lens.

14. An optical pickup device according to claim 13, wherein the parallel plate is located on an optical path in which a laser light beam becomes parallel light.

* * * * *